United States Patent
Jiménez et al.

(10) Patent No.: US 9,973,478 B2
(45) Date of Patent: May 15, 2018

(54) CONTROLLING WRITE ACCESS TO A RESOURCE IN A RELOAD NETWORK

(71) Applicant: Telefonaktiebolaget L M Ericsson (publ), Stockholm (SE)

(72) Inventors: Jaime Jiménez, Helsinki (FI); Gonzalo Camarillo Gonzalez, Helsinki (FI); Manuel Urueña Pascual, Leganés (ES)

(73) Assignee: Telefonaktiebolaget L M Ericsson (publ) (SE)

( * ) Notice: Subject to any disclaimer, the term of this patent is extended or adjusted under 35 U.S.C. 154(b) by 105 days.

(21) Appl. No.: 14/772,302

(22) PCT Filed: Mar. 7, 2013

(86) PCT No.: PCT/EP2013/054651
§ 371 (c)(1),
(2) Date: Sep. 2, 2015

(87) PCT Pub. No.: WO2014/135214
PCT Pub. Date: Sep. 12, 2014

(65) Prior Publication Data
US 2016/0036784 A1    Feb. 4, 2016

(51) Int. Cl.
*H04L 9/32* (2006.01)
*H04L 29/06* (2006.01)
*H04L 29/08* (2006.01)

(52) U.S. Cl.
CPC ........ *H04L 63/0428* (2013.01); *H04L 63/061* (2013.01); *H04L 63/062* (2013.01);
(Continued)

(58) Field of Classification Search
None
See application file for complete search history.

(56) References Cited

U.S. PATENT DOCUMENTS

| 8,826,010 B2 * | 9/2014 | Rescorla | H04L 9/3268 713/158 |
| 2005/0091491 A1 * | 4/2005 | Lee | G06F 21/10 713/167 |

(Continued)

OTHER PUBLICATIONS

Jennings, C. et al., "REsource LOcation and Discovery (RELOAD) Base Protocol", Internet Engineering Task Force, P2PSIP, Internet-Draft, Mar. 28, 2012, pp. 1-167.
(Continued)

*Primary Examiner* — Brandon S Hoffman
(74) *Attorney, Agent, or Firm* — Murphy, Bilak & Homiller, PLLC

(57) ABSTRACT

Methods and apparatus for controlling write access by one or more accessing nodes to a resource within a Resource Location And Discovery, RELOAD, network. The methods and apparatus configured to: at a node owning the resource, obtain a public key of a peer responsible for the resource, encrypt a write key using the obtained public key and send the encrypted write key to the peer responsible for the resource; at the peer responsible for the resource, decrypt the write key; at an accessing node, sign data to be written to the resource using the write key and send a request to the peer responsible for the resource to write the signed data to the resource; and at the peer responsible for the resource, control write access to the resource based on the decrypted write key and the signed data.

17 Claims, 6 Drawing Sheets

(52) U.S. Cl.
CPC .......... *H04L 63/10* (2013.01); *H04L 67/1076* (2013.01); *H04L 63/0442* (2013.01); *H04L 63/12* (2013.01); *H04L 67/1093* (2013.01); *H04L 2463/062* (2013.01)

(56) References Cited

U.S. PATENT DOCUMENTS

| | | | |
|---|---|---|---|
| 2011/0173460 A1* | 7/2011 | Ito | H04L 9/0836 |
| | | | 713/193 |
| 2011/0252151 A1* | 10/2011 | Lu | H04W 80/045 |
| | | | 709/228 |
| 2014/0181234 A1* | 6/2014 | Hsiao | G06F 17/30578 |
| | | | 709/213 |
| 2015/0161409 A1* | 6/2015 | Szebeni | G06F 21/6272 |
| | | | 713/165 |

OTHER PUBLICATIONS

Jennings, C. et al., "REsource LOcation and Discovery (RELOAD) Base Protocol", P2PSIP Internet-Draft, Jan. 2013, pp. 1-173.
Jimenez, J. et al., "A Constrained Application Protocol (CoAP) Usage for REsource Location and Discovery (RELOAD)", Internet Engineering Task Force, Internet-Draft, Aug. 20, 2012, pp. 1-18.
Knauf, A. et al., "A Usage for Shared Resources in RELOAD (ShaRe)", P2PSIP Working Group Internet-Draft, Apr. 2012, pp. 1-23.

* cited by examiner

CONTROLLING WRITE ACCESS TO A RESOURCE IN A RELOAD NETWORK

TECHNICAL FIELD

The invention relates to methods and apparatus for writing data to a resource in a Resource Location And Discovery Base (RELOAD) network. More specifically, the invention relates to methods and apparatus for writing data to a resource in a RELOAD network by a node other than the resource owner.

BACKGROUND

The Peer-to-Peer (P2P) Session Initiation Protocol (SIP) Working Group (P2PSIP WG) of the Internet Engineering Task Force (IETF) is specifying the RELOAD base protocol for building distributed systems based on peer-to-peer (P2P) technologies. In particular, a large proportion of the work undertaken by the working group is focused on Distributed Hash Tables (DHTs). A DHT provides a distributed storage service, where resources are stored at a peer that, along with other peers, forms an overlay network.

A resource is stored based on a Resource-ID, which is commonly a hashed user name of a node owning the resource. A Kind-ID specifies the kind of data that may be stored at a resource.

In RELOAD, resources can be read (e.g. using a Fetch Request) by any node that knows the Resource-ID of the resource. However, for security and in order to limit the volume of information a node can store into the network, RELOAD defines a number of Access Control Policies to control which entities can create a resource and write data to a resource.

The standard access control policies defined in RELOAD are based on the User-ID (e.g. USER-MATCH) or the Node-ID (e.g. NODE-MATCH). The User-ID and the Node-ID of a node are included in the node's certificate. Typically, the node is assigned one or more Node-IDs by a central enrolment authority, although other approaches, such as a Web of Trust type model, could be used. Both the User-ID and the Node-ID are placed in a node certificate, along with the node's public key.

With RELOAD access control policies, usually a resource can only be created, written or rewritten by a single node, called the "owner" of the resource, typically the node that created the resource.

An access control policy that enables multiple nodes to write in the same resource is the USER-NODE-MATCH, which allows any node to write a single entry to a Dictionary resource, the Resource-ID of which must correspond to the Node-ID. USER-NODE-MATCH may only be used with Dictionary resources.

In RELOAD-ACL, a new access control policy, called USER-CHAIN-ACL, is defined, which allows the resource's owner to share write permissions with other nodes. This is done by associating an Access Control List (ACL) to a shared resource, and explicitly listing all users and/or nodes that have write permission for the resource.

The two policies mentioned above have some drawbacks. USER-NODE-MATCH can only be applied to Dictionary resources and allows any node of the RELOAD network with a valid certificate to write one entry in any Dictionary resource. Therefore, in order to protect its own resources, peers will commonly limit the size of such Dictionary resources. This allows the possibility of Denial of Service (DoS) attacks, as an attacker node with one or more valid certificates is able to store a high volume of data to a Dictionary resource, thereby exceeding its size limit. This prevents legitimate users from storing data. In USER-CHAIN-ACL, only users explicitly allowed by the owner of the resource (via the ACL) are able to write data. However this requires the owner node to know beforehand the list of legitimate users. Moreover, a resource cannot be shared by an arbitrary number of users, because of the burden placed on the peer responsible for the resource in managing the ACL, as well as all the associated certificates. Therefore, the size of the ACL will be limited by the peers storing to it, in particular, as the ACL resource is shared by all the USER-CHAIN-ACL resources within the same address space.

SUMMARY

In order at least to mitigate the problems identified above, there is provided herein methods and apparatus to allow a node that is not the original owner of a resource to write to a resource.

According to an aspect of the invention, there is provided a network device configured as a peer responsible for a resource within a Resource Location And Discovery, RELOAD, network. The network device comprises a communicator configured to receive a message originating from a node owning the resource. The message comprises a write key encrypted using a public key of the network device. The communicator is further configured to receive a request to store data at the resource. The request originating from one or more accessing nodes and comprising data signed using the write key, the one or more accessing nodes being different to the node owning the resource. The network device comprises a decryptor configured to decrypt the encrypted write key using the network device's private key. The network devices also comprises an access controller configured to control write access to the resource by the one or more accessing nodes based on the write key and the received signed data.

Optionally, the access controller is configured to write the received data to the resource if the received data has been signed using the write key.

Optionally, the message originating from the node owning the resource further comprises a signing algorithm to be used by the one or more accessing nodes when signing the data. The access controller may be further configured to write the received data to the resource if the received data has been signed using the signing algorithm and the write key.

Optionally, the network device further comprises a replicator configured to replicate the resource at a further peer of the RELOAD network by sending a Store Request message to the further peer. The replicator may be configured to encrypt the write key with the obtained public key of the further peer and send the encrypted write key to the further peer in the Store Request message.

According to an aspect of the invention, there is provided a network device configured as a node owning a resource within a Resource Location And Discovery, RELOAD, network. The network device comprises a communicator configured to communicate with one or more nodes within the RELOAD network to obtain a public key of a peer responsible for the resource. The network device also comprises an encryptor configured to encrypt a write key using the obtained public key. The communicator is further configured to send the encrypted write key to the peer responsible for the resource for controlling write access to the resource.

Optionally, the communicator is further configured to send a signing algorithm to the peer responsible for the resource identifying the signing algorithm that should be used by one or more accessing nodes requesting write access to the resource.

Optionally, the communicator is configured to send the encrypted write key and/or the signing algorithm in a Store Request message defining a StoreKindData structure.

Optionally, the network device is embedded within a computer system and further comprises an instruction processor configured to receive instructions from one or more accessing nodes, via the resource.

Optionally, the instruction processor is configured to poll the resource at different times to retrieve instructions.

Optionally, the network device is further configured to change the write key before a generation counter rolls over, the generation counter being associated with values stored in the resource.

According to an aspect of the invention, there is provided a vehicle comprising a network device configured as a node owning a resource, as described above.

According to an aspect of the invention, there is provided a network device configured as an accessing node for writing data to a resource within a Resource Location And Discovery, RELOAD, network. The resource is owned by a different node. The network device comprises a signer configured to sign data to be written to the resource using a write key. The network device also comprises a communicator configured to generate a request to write the signed data to the resource not owned by the network device and send the request to a peer responsible for the resource.

Optionally, the signer is configured to sign the data using the write key and a predetermined signing algorithm.

Optionally, the communicator is configured to generate and send a Store Request.

Optionally, the Store Request comprises a Resource-ID of the resource.

According to an aspect of the invention, there is provided a method of controlling a network device configured as a peer responsible for a resource within a Resource Location And Discovery, RELOAD, network. The method comprises, at the network device, receiving a message originating from a node owning the resource. The message comprises a write key encrypted using a public key of the network device. The method further comprises, at the network device, receiving a request to store data at the resource. The request originating from one or more accessing nodes and comprising data signed using the write key, the one or more accessing nodes being different to the node owning the resource. The method further comprises, at the network device, decrypting the encrypted write key using the network device's private key. The method further comprises, at the network device, controlling write access to the resource by the one or more accessing nodes based on the write key and the received data.

According to an aspect of the invention, there is provided a method of controlling a network device configured as a node owning a resource within a Resource Location And Discovery, RELOAD, network. The method comprises, at the network device, communicating with one or more nodes within the RELOAD network to obtain a public key of a peer responsible for the resource. The method further comprises, at the network device, encrypting a write key using the obtained public key. The method further comprises, at the network device, sending the encrypted write key to the peer responsible for the resource for controlling write access to the resource.

According to an aspect of the invention, there is provided a method of controlling a network device configured as an accessing node for writing data to a resource within a Resource Location And Discovery, RELOAD, network, wherein the resource is owned by a different node. The method comprises, at the network device, signing data to be written to the resource using a write key. The method further comprises, at the network device, generating a request to write the signed data to the resource not owned by the network device. The method further comprises, at the network device, sending the request to a peer responsible for the resource.

According to an aspect of the invention, there is provided a system for controlling write access by one or more accessing nodes to a resource within a Resource Location And Discovery, RELOAD, network. The system comprises a node owning the resource and configured to obtain a public key of a peer responsible for the resource, to encrypt a write key using the obtained public key and to send the encrypted write key to the peer responsible for the resource. The peer responsible for the resource is configured to decrypt the encrypted write key. The system further comprises an accessing node configured to sign data to be written to the resource using the write key and to send a request to the peer responsible for the resource to write the signed data to the resource. The peer responsible for the resource is further configured to control write access to the resource based on the decrypted write key and the signed data.

According to an aspect of the invention, there is provided a method of controlling write access by one or more accessing nodes to a resource within a Resource Location And Discovery, RELOAD, network. The method comprises, at a node owning the resource, obtaining a public key of a peer responsible for the resource, encrypting a write key using the obtained public key and sending the encrypted write key to the peer responsible for the resource. The method further comprises, at the peer responsible for the resource, decrypting the write key. The method further comprises, at an accessing node, signing data to be written to the resource using the write key and sending a request to the peer responsible for the resource to write the signed data to the resource. The method further comprises, at the peer responsible for the resource, controlling write access to the resource based on the decrypted write key and the signed data.

According to an aspect of the invention, there is provided a non-transitory computer readable medium comprising computer readable code configured to carry out any of the methods disclosed above.

DETAILED DESCRIPTION

The inventors have appreciated that all RELOAD access control policies require the verification of the identity of a node wishing to perform a store operation. That is, it is required to obtain and validate a node's certificate, then check the signatures of the values to be stored. These checks involve asymmetric public-key cryptography operations, which are generally more complex than symmetric cryptography operations.

Figure 1:
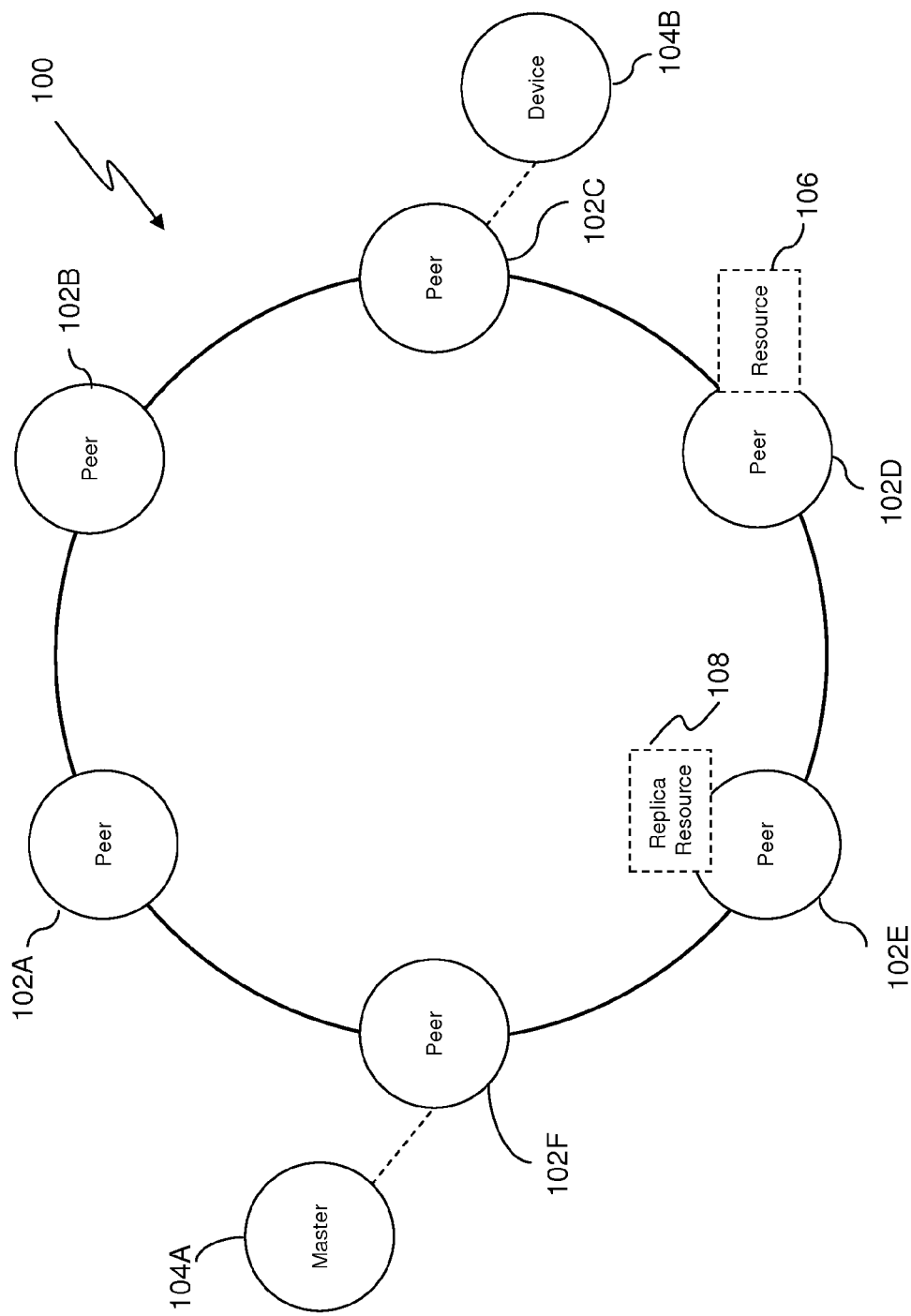
FIG. 1 is a schematic representation of a RELOAD network.

Referring to FIG. 1, a RELOAD network 100 comprises a plurality of peers 102A-F that together form an overlay network. One or more clients 104A-B, which do not form part of the overlay network, are in electrical communication with at least one peer 102. Each peer is responsible for one or more resources 106 saved at the peer. In the exemplary RELOAD network 100 of FIG. 1, one of the clients 104 is shown as a master 104A and another is shown as a device 104A. In exemplary methods and apparatus, the master 104A may store instructions for the device 104B in the resource 106, as discussed in more detail below. It is noted that the term "node" as used herein encompasses both peers 102 and clients 104.

Each resource 106 has a "Kind", as defined in the RELOAD base protocol. An access control policy associated to the resource's Kind defines what users and/or what nodes are able to create the resource. That is, the access control policy defines what users and/or what nodes are able to perform the first Store operation. Once a resource 106 is created, the node which created it is termed the "owner" node. The resource 106 is stored at a peer 102D of the overlay network based on a Resource-ID. The Resource-ID is commonly determined by hashing the User-ID or the Node-ID of the owner node and defines a unique address for the resource 106. Each peer 102 within the overlay network is responsible for a range of addresses and the Resource-ID specifies a peer 102D at which the resource 106 is stored. This peer is termed the "responsible peer" and is the peer responsible for the resource 106, in particular, for controlling which nodes may store data at the resource 106.

As discussed above, generally, in a RELOAD network 100, only the node 104B owning a resource 106 is permitted to store data to the resource 106. RELOAD uses, for example, USER-MATCH and NODE-MATCH policies to limit write access for a resource 106 to the owner 104B. A request to store data at a resource 106 (Store Request) is sent from a node 104B owning the resource 106 to a peer 102C of the overlay network. The request is transmitted over the overlay network as necessary and reaches the peer 102D responsible for the resource 106. The Store Request includes the owner node's certificate and the data to be stored. The data to be stored is signed with the owner node's private key. The certificate includes the owner node's public key, which allows the peer 102D to verify that the node sending the Store Request is the owner node 104B. The certificate also includes the owner node's USER-ID and Node-ID, which allows the responsible peer 102D to check that the Resource-ID of the resource 106 corresponds to a hashed User-ID or Node-ID. Under the USER-MATCH, if the name hashes to the Resource-ID, the data is stored in the resource 106. Under the NODE-MATCH policy the Node-ID hashes to the Resource-ID, the data is stored to the resource 106. As a result, in USER-MATCH and NODE-MATCH, only the owner 104B can write to the resource 106.

Generally, the methods and apparatus disclosed herein allow nodes 104A that do not own a resource 106 to store data at that resource 106. In exemplary methods and apparatus, this is done by associating a secret write key to the resource 106. Generally, the owner node 104B obtains the public key of the responsible peer 102D and encrypts the write key with the peer's public key. The owner node 104B sends the encrypted write key to the peer 102D in a Store Request. The Store Request may also include a MAC algorithm that should be used by other accessing nodes 104A wishing to store data at the resource 106.

Drawbacks of USER-NODE-MATCH and USER-CHAIN-ACL may be demonstrated with the following example. An embedded device may employ a RELOAD distributed hash table (DHT) as a mechanism to receive commands from one or more masters, since it may be behind a firewall/NAT or sleeping most of time. One way to receive such instructions is for the device to create a resource in the RELOAD network. The master(s) may store instructions in the resource and the device may poll the resource periodically to check whether any instructions from the masters have been stored. If instructions have been stored, these can be retrieved and undertaken by the device. The master(s) only need to know the device's User-ID or Node-ID in order to determine the Resource-ID of the resource and store instructions to it (as the resource has a Resource-ID=hash (User-ID) or hash(Node-ID)). The inventors have appreciated that, using current policies in the RELOAD base protocol has certain drawbacks.

If the resource is a Dictionary resource with a USER-NODE-MATCH access control policy, each master is only able to store one command at the time. Further, an attacker node with one or more valid certificates can easily perform a DoS attack against the devices by overflowing the shared resource, as the peer responsible for the resource does not know which nodes are valid masters.

If the resource uses a USER-CHAIN-ACL access control policy, the device must know beforehand the User-IDs and/or Node-IDs of all the possible masters before being deployed so that they may be included in the ACL. This complicates the management and deployment of devices, especially in the case of embedded devices that do not have a dedicated control interface (e.g. an USB port), as such devices may not be reconfigurable to update the list of master nodes. Therefore a simpler mechanism to enable initially unknown masters to write commands in the resource of a deployed embedded device would be beneficial.

It is noted that the above is an example scenario only and the methods and apparatus disclosed herein may be applied to other scenarios. Accordingly, the above example does not limit the scope of the invention.

Disclosed herein are methods and apparatus for sharing a resource 106 of a RELOAD-based DHT network 100 among an arbitrary number of nodes, without knowing in advance the full list of allowed nodes. That is, the methods and apparatus disclosed herein provide write access to one or more accessing nodes 104A that are not the owner node 104B of a resource 106 but which wish to store data to the resource 106. The number of accessing nodes 104A can be arbitrary and can be increased or decreased "on-the-fly". In exemplary methods and apparatus, membership to the set of allowed accessing nodes 104A is defined by demonstrating the possession of a secret key associated with the resource 106. The secret key is known by all members of the set. Exemplary methods and apparatus disclosed herein can be applied to any of the RELOAD access control policies already defined.

A node 104B creates a resource 106 at a peer 102D. The node 104B is referred to as the owner node and the peer 102D is referred to as the responsible peer. In exemplary methods and apparatus, the resource may be written to by an accessing node 104A, which is not the owner node 104B. In the exemplary network of FIG. 1, the owner node 104B and the accessing node 104A are shown as clients but in other exemplary networks, the owner node 104B and the accessing node 104A may be peers. In exemplary methods and apparatus, the owner node 104B may be a device embedded in a separate system. For example, the device may be a sensor embedded in a system fitted to a vehicle. The device may be configured to receive instructions from one or more master nodes 104A, which may be remote from the device in that they are at a separate location within the network.

Figure 2:
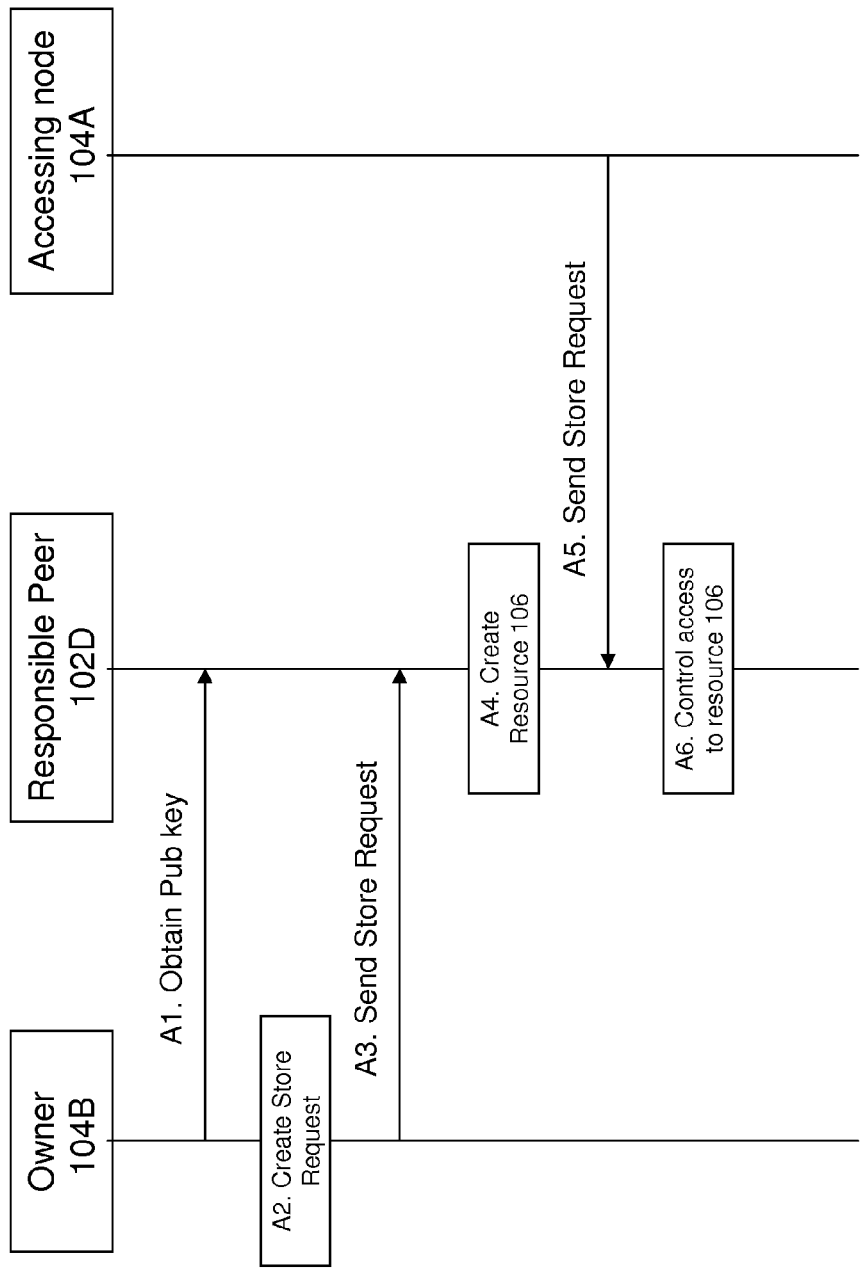
FIG. 2 is a signalling flow diagram showing a method of controlling access to a resource in a RELOAD network.

FIG. 2 shows a signalling flow diagram showing exemplary methods implemented to allow an accessing node 104A to have write access to a resource 106, wherein the accessing node 104A is not the owner node 104B. The owner node 104B is able to create a resource 106 and share its write permissions with other nodes 104A by means of a shared secret write key mechanism.

The actions undertaken are:

A1 The owner 104B obtains the public key for the responsible peer 102D. This may be done by sending a Ping Request to the responsible peer 102D. The response to the Ping Request includes the certificate of the responsible peer 102D, which includes the responsible peer's public key.

A2 The owner 104B creates a Store Request message as defined in the RELOAD base protocol, but with a specific StoreKindData structure. To create the StoreKindData structure, the owner node 104B encrypts a secret write key with the public key of the responsible peer and includes it in the StoreKindData structure. The data structure may also specify a message authentication code (MAC), which specifies the authentication algorithm that must be used by the accessing node 104A when writing to the resource 106. Other types of authentication algorithm may be used.

An exemplary StoreKindData structure is provided below:

```
struct {
    KindId            kind;
        uint64        generation_counter;
    uint8             key_sign_type;
    WriteKeySign      write_key_sign;
    StoredData        values<0..2^32-1>;
}StoreKindData;
struct {
select(key_sign_type) {
caseWRITE_KEY:
WriteKeywrite_key;
caseWRITE_SIGN:
    Signature write_sign;
        Case NONE:
            // Nothing
    }
} WriteKeySign;
```

```
struct {
MACAlgorithmmac_algorithm; // From TLS
opaque                      encrypted_key<0..255>;
} WriteKey;
```

Where key_sign_type=WRITE_KEY, the mac_algorithm field defines the MAC to be employed by accessing nodes 104A and the encrypted_key field contains the secret write key associated to the resource 106, encrypted with the public key of the responsible peer 102D storing the resource (e.g. encrypted_key=crypt{secret_key, Pub$_{responsible\_peer}$}). The MAC algorithm may be, for example, HMAC-SHA256.

A3 The owner node 104B sends the Store Request towards the responsible peer 102D. The Store Request may be sent directly to the responsible peer 102D, if the owner node 104B is in direct electrical communication with the responsible peer 102D. The Store Request may be sent to another node, such as a separate peer (e.g. 102C) in the overlay network, and passed to the responsible peer 102D. As the secret write key has been encrypted by the public key of the responsible peer 102D, only the responsible peer 102D is able to decrypt the secret write key. Therefore, other nodes in the RELOAD network 100 are not able to "snoop" the secret write key.

Therefore, in exemplary methods and apparatus, the owner node 104B, and only the owner node 104B, may delegate the permission to (re)write on the resource 106 by specifying a secret key in a newly-defined field, called write_key, of the Store Request operation. The secret key is encrypted using the public key of the responsible peer 102D storing the resource, thus it cannot be snooped by other peers in the RELOAD network 100 forwarding the Store Request message. The same mechanism may be then employed when storing the resource at the replicas, as discussed below.

A4 The responsible peer 102D creates the resource 106. The responsible peer 102D decrypts the secret write key using its private key and may store the decrypted write key in a memory. The secret write key is thereby associated with the resource 106. If the owner node 104B also sent a MAC in the Store Request, the responsible peer 102D may store the MAC in a memory and also associates the MAC with the resource 106.

A5 An accessing node 104A sends a Store Request message to the responsible peer 102D. The data in the Store Request message is the data that the accessing node 104A wishes to store in the resource 106. The data is signed by the accessing node 104A using the secret write key, which is known to the accessing node 104A. If a MAC is associated with the resource 106, the accessing node 104A signs the data using the secret write key and the MAC.

After establishing a secret write key and associating it with the resource 106, any node that knows the secret key is able to submit Store Request operations to the responsible peer 102D. In the exemplary data structure provided above, this is done by setting key_sign_type=WRITE_SIGN, and a write_sign field (defined in the RELOAD base protocol) containing the MAC value of the whole StoreKindData structure (i.e. without the write_sign field itself) concatenated with the Resource-ID (e.g. signature_value=hmac{StoreKindData|resourceID, secret_key}). If a MAC algorithm has been associated with the resource 106, the algorithm used by accessing nodes must be the one specified in the mac_algorithm field of the Store Request operation originally sent to the responsible peer 102D by the owner 104B.

A6 The responsible peer 102D receives the Store Request message from the accessing node 104B and controls accessing to the resource 106 based on the decrypted write key and the signed data. The responsible peer 102D is able to use its copy of the decrypted secret write key to verify that the accessing node 104A has possession of the secret key and is therefore authorised to store data to the resource 106. Therefore, if the responsible peer verifies that the accessing node 104A has signed the data using the secret write key, it allows the data to be stored to the resource 106. If a signing algorithm has been associated with the resource 106, the responsible peer also verifies that the correct signing algorithm has been used by the accessing node 104A when signing the data before allowing the data to be stored.

Using the method disclosed above, an access control policy, which may be termed KEY-MATCH, allows a resource 106 to be shared by an arbitrary number of nodes, without requiring an explicit list of allowed devices, as in, for example, the USER-CHAIN-ACL access control policy. Therefore, the methods and apparatus disclosed herein do not require the owner node 104B of the resource 106 to know beforehand the list of nodes sharing the resource 106. Since the methods and apparatus disclosed herein do not allow external nodes (i.e. that do not know the shared key) to write any data in the resource 106, it is not vulnerable to the Denial of Service (DoS) attack discussed above.

Further, the responsible peer 102D storing data at the resource 106 can easily determine whether the accessing node 104A is allowed to write to the resource 106, just by checking the signed data in the Store Request, instead of looking for the User-ID and Node-ID in the ACL and then checking the public-key signature of the message, which also requires obtaining and validating the certificate of the requester.

It is noted that the owner node 104B is able to store data at the resource 106 by sending to the responsible peer 102D a Store Request that includes no write_key_sign field (i.e. key_sign_type=NONE).

In exemplary methods and apparatus, the owner node 104B can change the secret write key and/or the MAC algorithm by sending a new Store Request message. Based on the exemplary structure provided above, the Store Request should include a key_sign_type field appropriately set (i.e. key_sign_type=write_key) and should identify a new secret write key encrypted with the responsible peer's 102D public key and/or a new signing algorithm, such as an MAC.

Since the write_key_sign field appears only in Store Request messages within the RELOAD base protocol, the rest of RELOAD data storage operations (e.g. Fetch, Stat) are unaffected by the methods and apparatus disclosed herein. It is noted that it is important for the secret write key not to "leak" in the meta-data of the resource (i.e. by a Stat operation).

Any node that knows the secret write key is able to perform a Store operation by additionally signing the data to be stored with the signing algorithm, such as HMAC, and using the associated secret key. Data stored in the resource 106 has a generation_counter field that should be incremented in every message. Therefore, replay attacks may be made less likely if the owner node 104B changes the secret write key associated with the resource before the generation_counter rolls over. That is, before the generation_counter exceeds its maximum value.

The responsible peer 102D may replicate the resource 106 in one or more replicas stored at other peers 102A-C & 102E-F. This can be done by sending a Store Request from the responsible peer 102D to a replica peer 102E.

Figure 3:
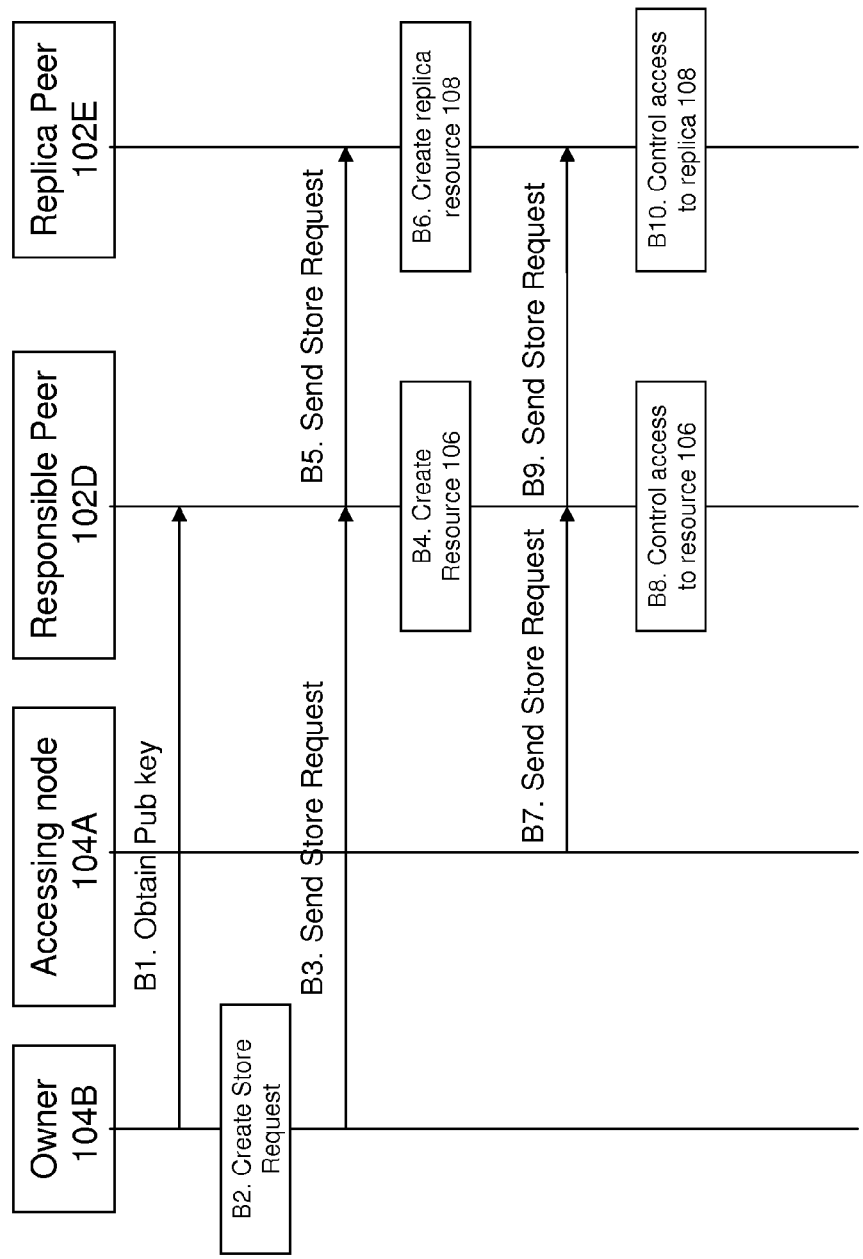
FIG. 3 is a signalling flow diagram showing a method of controlling access to a resource in a RELOAD network and replicating the resource at a replica peer.

FIG. 3 shows a signalling flow diagram showing exemplary methods implemented to allow the responsible peer 102D to create a replica resource 108 at another peer 102E.

In exemplary methods and apparatus, the actions undertaken in FIG. 3 may be concatenated with the actions shown in FIG. 2.

The actions undertaken are:

B1-B4 The owner node 104B obtains the public key of the responsible peer 102D, creates a Store Request and sends the Store Request to the responsible peer 102D. The responsible peer 102D creates the resource 106. Actions B1-B4 are similar to actions A1-A4 above and are not explained in detail again.

B5 The responsible peer 102D creates and sends a Store Request to the replica peer 102E. The Store Request includes a wholewrite_key field. The encrypted secret write key received from the owner node 104B is decrypted and then encrypted with the replica peer's public key (e.g. encrypted_key=crypt{secret_key, $Pub_{replica\_peer}$}. Each peer stores in its cache the certificates of the other peers in the overlay network and so each peer knows the public key of every other peer. If not, the public key of the replica peer 102E can be obtained by sending a Ping Request in a similar way to the mechanism described in A1/B1.

B6 The replica peer 102E creates a replica resource 108 in a similar way to the responsible peer 102D. That is, the replica peer 102E decrypts the secret write key using its private key and may store the decrypted write key in a memory. The secret write key is thereby associated with the replica resource 108. If the owner node 104B also sent a signing algorithm, such as a MAC, in the Store Request to the responsible peer 102D, this may be sent to the replica peer 102E, which may store the MAC in a memory and also associate the MAC with the replica resource 108.

B7-B8 An accessing node 104A sends a Store Request to the responsible peer 102D and the responsible peer 102D controls write access to the resource 106 in a similar way to that disclosed in actions A5-A6.

B9-B10 The responsible peer sends a Store Request to the replica peer 102E. In this case, the responsible peer 102D does not have to send the write_sign Signature field to the replicas, since it has already been verified by the responsible peer 102D. That is, the key_sign_type=NONE. The replica peer 102E writes the data to the replica resource 108 based on the verification undertaken by the responsible peer 102D.

Figure 4:
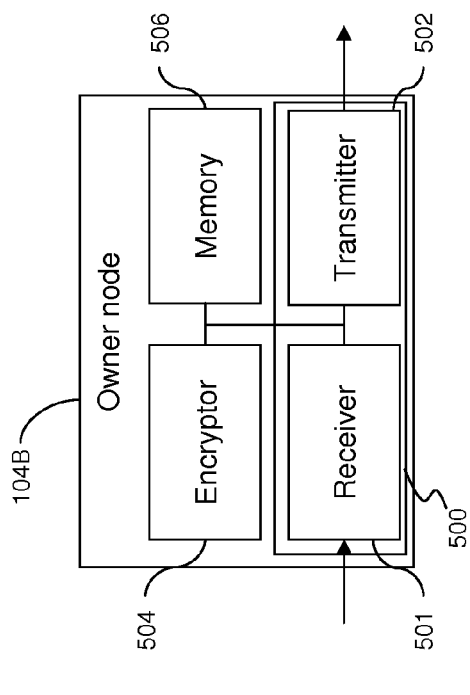
FIG. 4 is a schematic representation of a responsible peer.

FIG. 4, shows a network device configured as a peer 102D responsible for a resource 106 in a RELOAD network 100. The responsible peer 102D comprises a communicator 400, which comprises a receiver 401 and a transmitter 402. The responsible peer 102D further comprises a decryptor 404, an access controller 405 and a memory 406. Each of the receiver 401, transmitter 402, processor 404 and memory 406 is in electrical communication with all of the other features 401, 402, 404, 406 in the responsible peer 102D. Further, the communicator 400 is in electrical communication with other nodes in the network 100 and configured to transmit and receive messages to/from those nodes. The responsible peer 102D can be implemented as a combination of computer hardware and software. In particular, the decryptor 404 and access controller 405 may be implemented as software configured to run on a processor. The memory 406 stores the various programs/executable files that may be implemented by a processor, and also provides a storage unit for any required data. The programs/executable files stored in the memory 406, and implemented by the processor, can include but are not limited to a communicator, a decryptor and an access controller that are configured to implement the methods described above.

In exemplary apparatus, the communicator 400, and specifically the receiver 401, is configured to receive a message originating from the owner node 104B comprising the secret write key encrypted with the public key of the responsible peer 102D.

Exemplary communicators 400 are configured to receive a Store Request from the owner node 104B to create the resource 106. The Store Request may comprise a StoreKindData structure as set out above. The Store Request may be an initial Store Request and the responsible peer may be configured to create a resource 106 in the memory 406. Alternatively, the Store Request may relate to an existing resource 106.

The communicator 400 is further configured to receive a request originating from an accessing node 104A to store data at the resource 106. The request comprises data signed by the accessing node 104A using the secret write key. The request may be a Store Request as set out above.

The decryptor 404 is configured to decrypt the encrypted secret write key using the private key of the responsible peer 102D. In exemplary responsible peers 102D, the decrypted secret write key may be stored in memory 406. The access controller 405 is configured to control write access to the resource 106 by the accessing node 104A, based on the write key and the received data. If the received data has been signed using the secret write key, the access controller may be configured to store the data at the resource 106.

The message originating from the owner node 104B may additionally comprise a signing algorithm, such as a MAC, as set out above. In such cases, the signing algorithm should be used by an accessing node when signing the data. The access controller may therefore be further configured to store the received data to the resource 106 if the data has been signed using the secret write key and the signing algorithm.

As set out above, the responsible peer 102D is configured such that the access controller allows the owner node 104B to store data to the resource 106. That is, the owner node 104B may store data to the resource 106 without the need to sign the data using the secret write key.

A replicator 407 may also be embodied on software run on a processor and configured to create a replica resource 108 at a replica peer 102E. The transmitter 402 may be configured to transmit a Store Request to the replica peer 102E. Therefore, the replicator 407 may be configured to obtain the public key of the replica peer 102E, encrypt the secret write key with the obtained public key and send the encrypted secret write key to the replica peer 102E.

Figure 5:
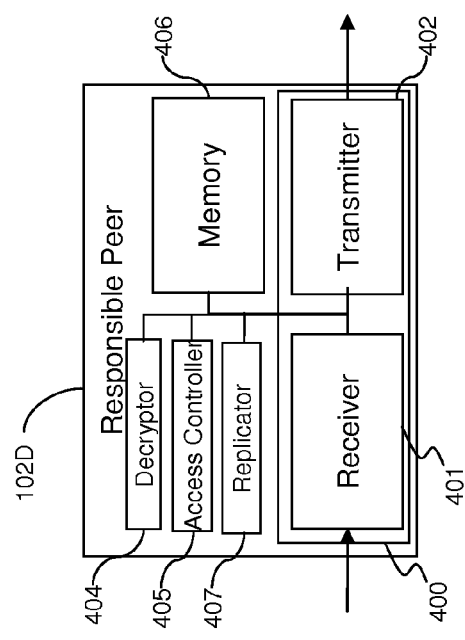
FIG. 5 is a schematic representation of an owner node.

FIG. 5 shows a network device configured as a node 104B owning a resource 106 within a RELOAD network 100. The owner node 104B comprises a communicator 500 comprising a receiver 501 and a transmitter 502. The owner node 104B further comprises an encryptor 504 and a memory 506. Each of the receiver 501, transmitter 502, encryptor 504 and memory 506 is in electrical communication with all of the other features 501, 502, 504, 506 in the owner node 104B. Further, the communicator 500 is in electrical communication with other nodes in the network 100 and configured to transmit and receive messages to/from those nodes. The owner node 104B can be implemented as a combination of computer hardware and software. In particular, the encryptor 404 and access controller 405 may be implemented as software configured to run on a processor. The memory 506 stores the various programs/executable files that are implemented by a processor, and also provides a storage unit for any required data. The programs/executable files stored in the memory 506, and implemented by the processor, can include but are not limited to a communicator and an encryptor that are configured to implement the methods described above.

Specifically, the communicator 500 is configured to communicate with other nodes in the network 100 to obtain the public key of the responsible peer 102D. The encryptor is configured to encrypt the write key using the obtained public key of the responsible peer 102D. The transmitter 502 of the communicator 500 is configured to send the encrypted write key to the responsible peer 102D for controlling write access to the resource 106.

The communicator 500 may communicate with the other nodes in the network 100 to obtain the public key using a Ping Request.

The communicator 500 may be further configured to send a signing algorithm with the encrypted write key. The signing algorithm should identify the signing algorithm to be used by an accessing node 104A that wishes to write to the resource 106. The encrypted write key and the signing algorithm may be sent in a Store Request defining a StoreKindData structure. The signing algorithm may be a MAC.

Figure 7:
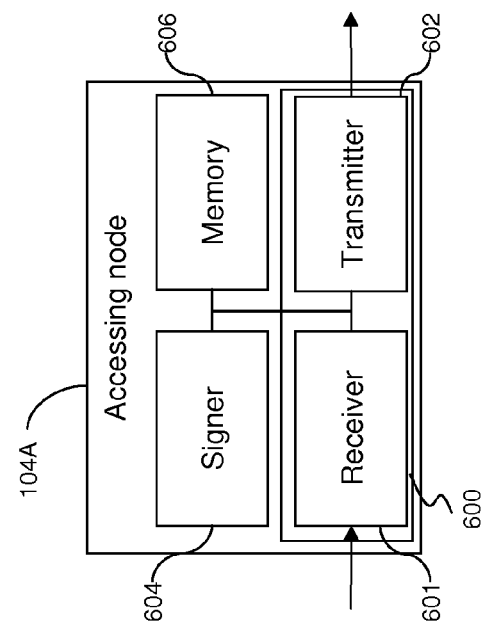
FIG. 7 is a schematic representation of a vehicle comprising an owner node.

The network device configured as an owner node 104B may be embedded in a computer system and may further comprise an instruction processor 505 configured to receive instructions from the accessing nodes 104A. As shown in FIG. 7, in an exemplary embedded computer system, the owner node 104B may be a device, such as a sensor, embedded within the computer system of a vehicle 700. The network device may therefore form part of a remote system configured to communicate with an overlay network of a RELOAD network 100. The sensor may be configured to receive instructions from the accessing nodes 104A via the resource 106. The sensor may poll the resource 106 at different times to retrieve instructions. The embedded device can be deployed without pre-configuring the full list of masters, but just with a randomly-generated secret write key. Then a master only needs to know the device's identifier and its secret write key. These data can be printed in a manual or may be stored in the device itself. Therefore a device can be easily controlled by an arbitrary number of masters without having to manage an explicit ACL.

Figure 6:
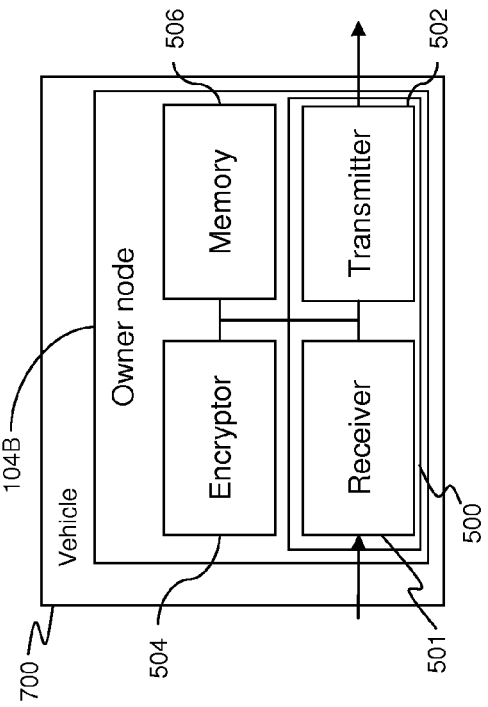
FIG. 6 is a schematic representation of an accessing node.

FIG. 6 shows a network device configured as an accessing node 104A that is separate to a node 104B owning a resource 106 within a RELOAD network 100. The accessing node 104A comprises a communicator 600 comprising a receiver 601 and a transmitter 602. The accessing node 104A further comprises a signer 604 and a memory 606. Each of the receiver 601, transmitter 602, signer 604 and memory 606 is in electrical communication with all of the other features 601, 602, 604, 606 in the accessing node 104A. Further, the communicator 600 is in electrical communication with other nodes in the network 100 and configured to transmit and receive messages to/from those nodes. The accessing node 104A can be implemented as a combination of computer hardware and software. In particular, the signer may be embodied in software for running on a processor. The memory 606 stores the various programs/executable files that are implemented by a processor, and also provides a storage unit for any required data. The programs/executable files stored in the memory 606, and implemented by the processor, can include but are not limited to a signer and a communicator that are configured to implement the methods described above.

The signer 604 is configured to sign data to be written to the resource 106 using the secret write key. The communicator 600 is configured to generate a request to write the data to the resource 106 not owned by the accessing node 104A and to send the request to the responsible peer 102D. The signer may be configured to use a predetermined signing algorithm, such as a MAC. The request may comprise a Store Request that comprises the Resource-ID of the resource 106.

Referring back to FIG. 1, the responsible peer 102D, the owner node 104B and the accessing node 104A may together form a system for controlling write access to a resource 106 in a RELOAD network 100.

Figure 8:
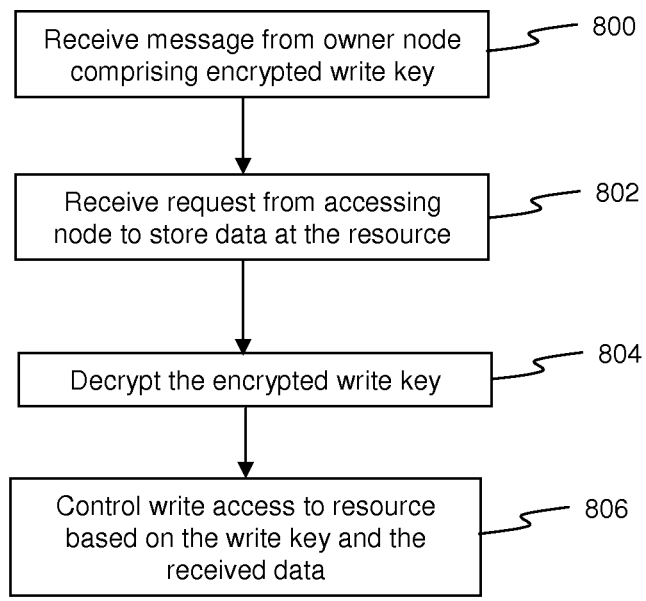
FIG. 8 is a flow diagram for a method of controlling a network device configured as a peer responsible for a resource within a RELOAD network.

FIG. 8 shows a flow diagram for a method of controlling a network device configured as a peer responsible for a resource within a RELOAD network. At the network device, a message originating from a node owning the resource is received 800. The message comprises the write key encrypted using a public key of the network device. A request to store data at the resource is received 802. The request originates from one or more accessing nodes and comprises data signed using the write key. The one or more accessing nodes are different to the node owning the resource. The encrypted write key is decrypted 804 using the network device's private key. Write access to the resource is controlled 806 by the one or more accessing nodes based on the write key and the received data.

Figure 9:
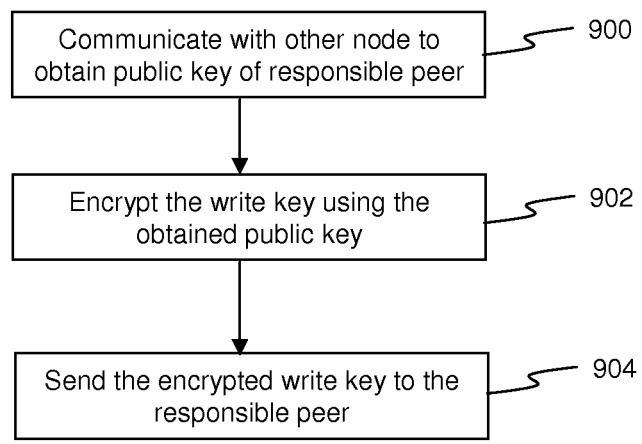
FIG. 9 is a flow diagram for a method of controlling a network device configured as a node owning a resource within a RELOAD network.

FIG. 9 shows a flow diagram for a method of controlling a network device configured as a node owning a resource within a RELOAD network. The network device communicates 900 with one or more nodes within the RELOAD network to obtain a public key of a peer responsible for the resource. The write key is encrypted 902 using the obtained public key. The encrypted write key is sent 904 to the peer responsible for the resource for controlling write access to the resource.

Figure 10:
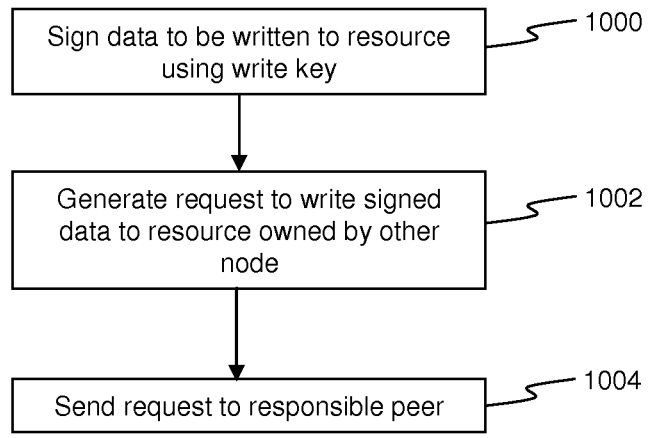
FIG. 10 is a flow diagram for a method of controlling a network device configured as an accessing node for writing data to a resource within a RELOAD network.

FIG. 10 shows a flow diagram for a method of controlling a network device configured as an accessing node for writing data to a resource within a RELOAD network, wherein the resource is owned by a different node. At the network device, data to be written to the resource is signed 1000 using the write key. A request to write the signed data to the resource not owned by the network device is generated 1002. The request is sent 1004 to the peer responsible for the resource.

Figure 11:
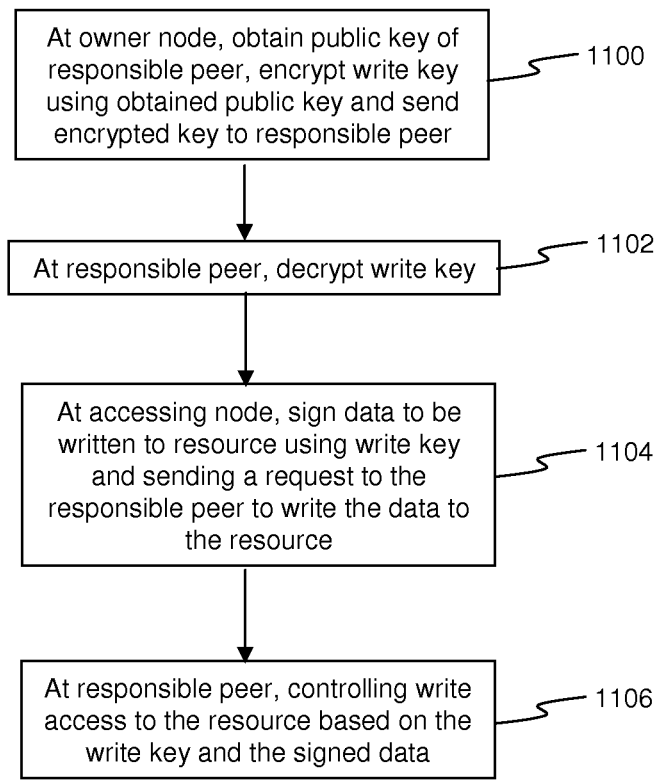
FIG. 11 is a flow diagram for a method of controlling write access by one or more accessing nodes to a resource within a RELOAD network

FIG. 11 shows a flow diagram for a method of controlling write access by one or more accessing nodes to a resource within a RELOAD network. At the node owning the resource, the public key of the peer responsible for the resource is obtained, the write key is encrypted using the obtained public key and the encrypted write key is sent to the peer responsible for the resource 1100. At the peer responsible for the resource, the write key is decrypted 1102. At the accessing node, data to be written to the resource is signed using the write key and a request is sent to the peer responsible for the resource to write the signed data to the resource 1104. At the peer responsible for the resource, write access to the resource is controlled based on the decrypted write key and the signed data.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will envisage further embodiments of the invention without departing from the scope of the appended claims.

The invention claimed is:

1. A network device configured as a peer responsible for a resource within a Resource Location And Discovery (RELOAD) network, the network device comprising:
   a communicator configured to receive a message originating from a node owning the resource, the message comprising a write key encrypted using a public key of the network device, and further configured to receive a request to store data at the resource, the request originating from one or more accessing nodes and comprising data signed using the write key, the one or more accessing nodes being different from the node owning the resource;
   a decryptor configured to decrypt the encrypted write key using a private key of the network device; and
   an access controller configured to control write access to the resource by the one or more accessing nodes based on the write key and the received signed data.

2. The network device of claim 1, wherein the access controller is configured to write the received data to the resource if the received data has been signed using the write key.

3. The network device of claim 1, wherein the message originating from the node owning the resource further comprises a signing algorithm to be used by the one or more accessing nodes when signing the data, and wherein the access controller is further configured to write the received data to the resource if the received data has been signed using the signing algorithm and the write key.

4. The network device of claim 1, further comprising a replicator configured to replicate the resource at a further peer of the RELOAD network by sending a Store Request message to the further peer, and wherein the replicator is configured to encrypt the write key with the obtained public key of the further peer and send the encrypted write key to the further peer in the Store Request message.

5. A network device configured as a node owning a resource within a Resource Location And Discovery (RELOAD) network, the network device comprising:
   a communicator configured to communicate with one or more nodes within the RELOAD network to obtain a public key of a peer responsible for the resource; and
   an encryptor configured to encrypt a write key using the obtained public key;
   wherein the communicator is further configured to send the following to the peer responsible for the resource:
      the encrypted write key for controlling write access to the resource; and
      an identification of a signing algorithm that should be used by one or more accessing nodes requesting write access to the resource.

6. The network device of claim 5, wherein the communicator is configured to send at least one of the encrypted write key and the signing algorithm in a Store Request message defining a StoreKindData structure.

7. The network device of claim 5, wherein the network device is embedded within a computer system and further comprises an instruction processor configured to receive instructions from one or more accessing nodes, via the resource.

8. The network device of claim 7, wherein the instruction processor is configured to poll the resource at different times to retrieve instructions.

9. The network device of claim 5, wherein the network device is configured to change the write key before a generation counter rolls over, the generation counter being associated with values stored in the resource.

10. A network device configured as an accessing node for writing data to a resource within a Resource Location And Discovery (RELOAD) network, the network device comprising:
    a signer configured to sign data to be written to the resource, owned by a first node different than the network device, using a write key and a predetermined signing algorithm; and
    a communicator configured to generate a request to write the signed data to the resource and send the request to a peer responsible for the resource, wherein the peer responsible for the resource is different than the network device and the first node owning the resource.

11. The network device of claim 10, wherein the communicator is configured to generate and send a Store Request.

12. The network device of claim 11, wherein the Store Request comprises a Resource-ID of the resource.

13. A method of controlling a network device configured as a peer responsible for a resource within a Resource Location And Discovery (RELOAD) network, the method comprising, at the network device:
    receiving a message originating from a node owning the resource, the message comprising a write key encrypted using a public key of the network device;
    receiving a request to store data at the resource, the request originating from one or more accessing nodes and comprising data signed using the write key, the one or more accessing nodes being different from the node owning the resource;
    decrypting the encrypted write key using a private key of the network device; and
    controlling write access to the resource by the one or more accessing nodes based on the write key and the received data.

14. A method of controlling a network device configured as a node owning a resource within a Resource Location And Discovery (RELOAD) network, the method comprising, at the network device:
    communicating with one or more nodes within the RELOAD network to obtain a public key of a peer responsible for the resource;
    encrypting a write key using the obtained public key; and
    sending the following to the peer responsible for the resource:
       the encrypted write key for controlling write access to the resource; and
       an identification of a signing algorithm that should be used by one or more accessing nodes requesting write access to the resource.

15. A method of controlling a network device configured as an accessing node for writing data to a resource within a Resource Location And Discovery (RELOAD) network, the method comprising, at the network device:
    signing data to be written to the resource, owned by a first node different than the network device, using a write key and a predetermined signing algorithm;
    generating a request to write the signed data to the resource; and
    sending the request to a peer responsible for the resource, wherein the peer responsible for the resource is different than the network device and the first node owning the resource.

16. A system for controlling write access by one or more accessing nodes to a resource within a Resource Location And Discovery (RELOAD) network, the system comprising:
- a node owning the resource and configured to obtain a public key of a peer responsible for the resource, to encrypt a write key using the obtained public key and to send the encrypted write key to the peer responsible for the resource;
- the peer responsible for the resource being configured to decrypt the encrypted write key; and
- an accessing node configured to sign data to be written to the resource using the write key and to send a request to the peer responsible for the resource to write the signed data to the resource;
- wherein the peer responsible for the resource is further configured to control write access to the resource based on the decrypted write key and the signed data.

17. A method of controlling write access by one or more accessing nodes to a resource within a Resource Location And Discovery (RELOAD) network, the method comprising:
- at a node owning the resource, obtaining a public key of a peer responsible for the resource, encrypting a write key using the obtained public key and sending the encrypted write key to the peer responsible for the resource;
- at the peer responsible for the resource, decrypting the write key;
- at an accessing node, signing data to be written to the resource using the write key and sending a request to the peer responsible for the resource to write the signed data to the resource; and
- at the peer responsible for the resource, controlling write access to the resource based on the decrypted write key and the signed data.

\* \* \* \* \*